United States Patent

Patterson

[15] 3,690,348
[45] Sept. 12, 1972

[54] TRAVELING VALVE

[72] Inventor: Billy R. Patterson, Diana, Tex.

[73] Assignee: Lone Star Steel Company, Dallas, Tex.

[22] Filed: Oct. 26, 1970

[21] Appl. No.: 83,729

[52] U.S. Cl....................................138/97, 15/104.06
[51] Int. Cl..............................................F16l 55/18
[58] Field of Search............138/89, 97; 15/104.06 R; 137/268; 132/93, 94

[56] References Cited

UNITED STATES PATENTS

| 3,298,399 | 1/1967 | Slade | 138/97 |
| 3,483,895 | 12/1969 | Barto | 138/93 X |
| 3,401,720 | 9/1968 | Telford | 138/97 X |
| 3,381,714 | 5/1968 | Johnson | 138/97 |

*Primary Examiner*—Herbert F. Ross
*Attorney*—Paul J. Luckern

[57] ABSTRACT

The present invention comprises a novel pipeline valve transportable by pipeline fluid adapted for isolating pipeline sections to permit location of a leak, and to stop the flow of pipeline fluid. The invention also concerns a novel process for isolating sections of a pipeline to permit location of a leak. The novel valve contains means for controlling the flow of the pipeline fluid in the valve and for stopping the valve when desired. A drop in pipeline fluid pressure shows a leak in the pipeline section traversed by the valve.

9 Claims, 1 Drawing Figure

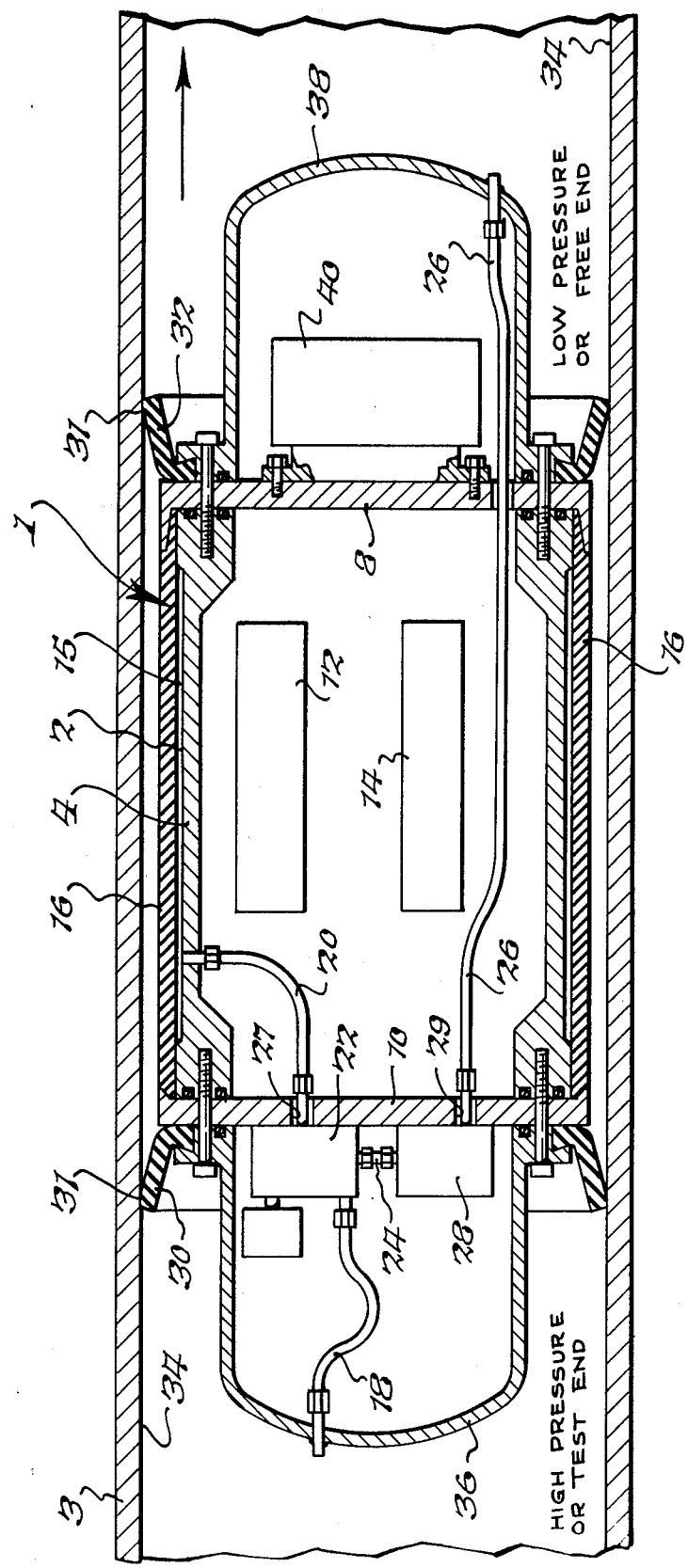

TRAVELING VALVE

BACKGROUND OF THE INVENTION

Pipelines are used conventionally to transport many substances, including such materials as petroleum products, chemicals, water and other fluids. The term "fluid," as used in this application, covers any pumpable medium and is intended to cover liquids, gases, suspensions, emulsions and the like. A pipeline may extend for hundreds of miles with permanent valves spaced along a pipeline to shut off the fluid flow. It can be above or below the ground. Generally, because of the expense of permanent valves, the valves are located long distances apart.

It is well known that pipelines develop leaks. Detection of the specific location of a leak can be a formidable and expensive task.

A traveling valve or "pig" for use in stopping the flow of pipeline fluids is not novel. U.S. Pat. No. 3,381,714 to Johnson discloses a transportable valve or "pig" for blocking partially or completely the flow of a fluid through a pipeline. The Johnson "pig" is described as containing a stopping means including an inflatable bladder and metal pistons, control means for controlling the flow of liquid through the pipeline, and an actuation means for acuating the stopping means and the control means in response to an outside signal.

The Johnson device suffers from a number of disadvantages. Thus, the metal pistons in Johnson's stopping means are detrimental to the inside diameter of the pipe. A pressure greater than the pressure of the pipeline fluid is necessary to inflate the Johnson bladder. The high pressure internal gas source used by Johnson to inflate the bladder is a source of danger to the user and further limits the number of stops his pig can take. Slight obstructions in the pipeline, e.g., weld bead, can obstruct travel of the loose fitting Johnson pig without stopping the flow of pipeline fluid.

U.S. Pat. No. 3,298,399 to Slade discloses a transportable pig which is said to automatically locate and temporarily seal a leak in a pipeline. The Slade pig contains an expandable sleeve, a valve means and a rattler. The valve means is said to allow pipeline fluid into the sleeve and expand it whenever the sleeve is forced against the inside surface of the pipe. The valve means is actuated when a leak in the pipe communicates with a closed annular space between the expandable sleeve of the pig and the inside wall of the pipe. The only power for stopping and holding the Slade pig in place is the pressure differential created in the leak area. In practice, and for most leaks, this area and pressure differential are insufficient to accomplish Slade's objective. Slade's pig also is not designed to stop the flow of pipeline fluid since a pipeline fluid flow through the pig is necessary to actuate the rattler in the pig to indicate an abnormal condition.

U.S. Pat. No. 3,483,895 to Barto discloses a pipeline shutoff pig for closing the interior of a pipeline in response to an outside radio signal source. The Barto device includes cooperating members inflatable by a compressed gas source in the pig. The gas source is controlled by valves in turn directed by remote radio means. Flexible members on the pig fit against the inside of the pipeline.

The Barto device has a number of disadvantages. Like the Johnson device, the Barto device requires a gas pressure higher than pumping medium to operate. Hence the use of this device would not be permitted in lines being tested near or to 100 percent theoretical yield of the pipe wall since the pipe wall opposite the stopping device would be subjected to excessive stresses. Travel of the Barto device in the pipeline is limited to one direction. The Barto device requires excessive number (four) radio receivers and solenoid valves. This in addition to a large electrical power requirement is a disadvantage due to space requirements inside the pig. The Barto device has no means to establish the geographic location of the pig in the pipeline although the Barto specification does suggest that a radio transmitter could be used for this purpose. In deflating the Barto device, the actuating gas is released into the pipeline fluid thus serving as a source of contamination to the pipeline fluid.

SUMMARY OF THE INVENTION

It is an object of my invention to provide a traveling pig or pipeline valve adapted to isolate sections of a pipeline for the location of a leak and to stop the flow of pipeline fluid with the elimination of the disadvantages in prior art devices.

It is a further object of my invention to provide an inexpensive, simple, efficient pig with a means that allows the pig to be propelled through the pipeline by the force of the pipeline fluid.

It is yet another object of my invention to provide a traveling pipeline valve with a means for causing, as desired, stoppage of the valve by the pressure of the pipeline fluid.

Another object of my invention is to provide a traveling pipeline valve for use in repairing leaks in a pipeline without a need for removing pressure, which can vary from 300–400 lbs. to 7,000 or 8,000 lbs. per square inch, from the complete pipeline.

It is also an object of my invention to provide a valve for stopping the flow of pipeline fluid, within a pipeline, for an indefinite period.

A further object of my invention is to provide a process for isolating sections of a pipeline which allows for a great savings in labor, time and pipeline fluid loss in comparison to prior art processes.

These and other objects of my invention will become more apparent upon further reading of the description and claims when taken in conjunction with the following illustration of which:

The single FIGURE of the drawing is a schematic diagram of a specific embodiment of my invention.

Broadly speaking, the traveling pipeline valve of my invention comprises a carrier shaped to fit into the inside diameter of a pipeline. Means are located within the device for controlling its movement and its stoppage. Flexible sealing means, conforming to the inside diameter of the pipeline and in constant contact with that inside diameter, allow the device to be effectively transported through the pipeline. Surrounding the carrier is a flexible elastic means that will expand as desired, and stop the device. Located within the device is a unit for transmitting a repeating signal, which signal continuously monitors the device in the pipeline.

DETAILED DESCRIPTION OF THE INVENTION

Referring specifically to the drawing, the traveling pipeline valve 1 of my invention includes carrier 2 comprising cylindrical side wall 4 and circular end walls 8 and 10. Carrier 2 contains compartment 12 for batteries and compartment 14 which is a signal receiver. Surrounding carrier 2 is a flexible expandable cylindrical elastic sleeve 16. Inlet tube 18 receives pipeline fluid at the high pressure end of my valve 1. The high pressure end of the valve 1 is that end which receives the pressure of the traveling fluid during testing. Tube or pipe 20 delivers pipeline fluid to and from elastic sleeve 16. A command (slave) signal actuator, e.g., a three way two-position solenoid valve 22 controls the flow of pipeline fluid to and from the annular space 15 surrounded by cylindrical elastic sleeve 16. Tube or pipe 24 and discharge tube or pipe 26 receive pipeline fluid for discharge at the low pressure end of the valve 1 from the elastic sleeve 16. Tube 26 is controlled by automatic check valve 28. Flexible cylindrical sealing sleeves 30 and 32 are positioned respectively at the high pressure and low pressure ends of my valve 1. The outer edges 31 of sleeves 30 and 32 conform to the inside diameter 34 of the pipeline 3 and are in constant contact with the pipeline 3. Housing chamber 36 at the high pressure end of the valve 1 contains inlet tube or pipe 18, and the valves 22 and 28. Housing chamber 38 at the low pressure end of the valve 1 contains a signaling device 40 for transmitting a repeating signal that continuously shows the location of the valve 1 in the pipeline 3.

OPERATION

In practice and for testing, traveling pipeline valve 1 is inserted into a pipeline 3 carrying fluid under pressure. Flexible cylindrical sealing means 30 at the high pressure end of the valve 1 isolates the outside diameter of the flexible expandable cylindrical elastic sleeve 16 from the high pressure pipeline fluid and allows transit of the valve 1 through the pipeline by the differential pressure created across the valve 1.

Flexible cylindrical sealing means 32 at the low pressure end of the valve 1 supports the valve while it is in transit. Signaling device 40 at the low pressure end continuously monitors the location of the valve 1 in the pipeline 3. On receipt of a signal from an outside source by signal receiver in compartment 14, a three way two-position solenoid valve 22 with power supplied by batteries from compartment 12, allows pipeline fluid into the annular space 15, causing expansion of the flexible elastic sleeve 16 against the inside wall diameter 34 of the pipeline 3 and a stopping and a holding of the valve 1 in place. The absence of a pressure drop in the pressure of the pipeline fluid indicates the absence of any leak in the section of pipeline 3 traversed by the valve 1. A drop of pressure shows a leak in the pipe section traversed by the valve 1. By systematically moving the traveling pipeline valve 1, repressuring and checking for pressure drop, the geographic location of any leak in a pipeline can be quickly determined.

For release and continued movement of the valve 1 on receipt of a signal by the signal receiver in compartment 14, valve 22 allows the discharge of pipeline fluid from space 15 through tubes 20, 24 and, via check valve 28, through discharge tube 26. Discharge of pipeline fluid from the annular space 15 deflates the sleeve 16, and allows the valve 1 to continue its travel through the pipeline 3. If desired, the valve 1 can be moved in a reverse direction by applying a pressure at the low pressure end of the value, that is, by reversing the direction of flow of said pipeline fluid in pipeline 3 so as to apply pressure to the sealing sleeve or cup 32 which, as shown in the drawing, faces oppositely to the sealing sleeve or cup 30. Check valve 28 prevents sleeve 16 from expanding during any reverse travel. The exact location of any leak can hence be readily determined by systematically moving the valve 1, repressuring and checking for pressure drop.

In my valve 1, any miniature three way two-position solenoid valve with sufficient working pressure can be used as the command signal actuator 22. A Vickers Miniature Directional Valve Model DIL—2A—H—20 (Plug Part A) with or without subplate (Model DILSM—30), depending on the piping system used is recommended. For the automatic check valve 28, any small check valve with sufficient working pressure can be used. A Vickers in-line check valve Model DT8P1—02—5, if conventional piping is used, is recommended. If a unitized manifold system is selected, a Vickers Model DM8M—15—10 miniature hydraulic check valve is recommended. In a "unitized manifold" system, pipe 24 can be eliminated and in place a vertical passage drilled directly in wall 10 and connecting openings 27 and 29. If desired piping 18, 20 and/or 26 can also be eliminated and similar alternatives utilized in my valve.

For the signal receiver in compartment 14, a compact radio control unit that will open and close a circuit may be used. When the pipeline is underground, generally about 3 feet to 6 feet under the surface, a circuit that will operate at 100 kilocycles or less should be used. The low frequency is needed for the signal to penetrate the soil and pipeline walls.

Only the receiver-decoder 14, would be installed in the valve 1. For the signaling device 40, any compact radio transmitter can be used. When the pipeline is underground, a transmitter that will operate at 100 kilocycles or less should be employed as with the signal receiver 14.

To power the signaling device 40, receiver 14, and solenoid valve 22 inside the valve 1, nickel-cadmium rechargeable batteries in compartment 12 are recommended. The carrier 2 and housing chambers 36 and 38 of my valve 1 can be made of A.I.S.I. or S.A.E. 1045 or 4140 steel although the specific material is purely a matter of choice. Any tough material would be applicable.

Sealing means 16 and sleeves 30 and 32 may be of any resilient material. Recommended materials are natural rubbers or any hard synthetic rubbers such as butadiene-acrylonitrile copolymer, neoprene or polyurethane hard rubbers. The sleeves 30 and 32 have been sold as such under the term "scraper cups" by the Oil states Rubber Co. of Arlington, Texas.

While my invention has been described with reference to a particular embodiment, this description is not to be construed in a limiting sense. For instance, in place of radio controls for the signal receiver in compartment 14 or the signaling device 40, radio-active, ultrasonic, electromagnetic, magnetic, atomic or other means can be used. Housing chambers 36 and 38 can be omitted from the traveling pipeline valve 1 and valves 28 and 22 and signaling device 40, if desired, inserted within carrier 2. Also, sleeves 30 and 32 can have one or more circumferential channels or ridges to increase the wear life of the sleeves. The pipeline 3 need not be circular nor should the side wall 4 and sleeves 30 and 32 be circular. Rather the pipeline can be square and the side wall 4 and sleeves 30 and 32 so modified.

Other variations and modifications will be apparent to those skilled in the art, and the claims appended hereto are intended to include all novel features which fall within the spirit of the invention.

What is claimed is:

1. A traveling pipeline valve adapted to isolate sections of a pipeline to permit location of a leak in said pipeline and to stop the flow of pipeline fluid comprising:
   1. a carrier shaped to fit the inside of said pipeline and having a high pressure end and a low pressure end;
   2. means for passage of said pipeline fluid through said carrier to furnish actuating power for controlling movement of said valve;
   3. flow control means including a command signal actuator device for controlling the flow of said pipeline fluid through said carrier from the high pressure end thereof and an automatic actuator device preventing flow of pipeline fluid through said carrier from the low pressure end thereof;
   4. means for receiving remote signals from an outside source to actuate said command signal actuator device;
   5. flexible sealing means comprising a cup facing axially outwardly from the high pressure end of said carrier and a cup facing axially outwardly from the low pressure end of said carrier, said flexible sealing means each being capable of conforming to the inside diameter of said pipeline and being in constant contact with said inside diameter;
   6. a flexible elastic means surrounding said carrier and between said flexible sealing means;
   7. said command signal actuator device being adapted to allow pipeline fluid from the high pressure end of said carrier into said elastic means to stop and hold said valve in place within said pipeline through expansion of said elastic means by said pipeline fluid;
   8. said command signal actuator device being adapted to release said pipeline fluid from said elastic means to deflate said elastic means by discharge of said pipeline fluid from said elastic means and out of the low pressure end of said carrier to permit movement of said valve;
   9. means within said valve for transmitting a repeating signal to continuously show the location of said valve in said pipeline;
   10. said sealing means at the high pressure end of said carrier isolating the outside diameter of said elastic means from the pipeline fluid; and
   11. said sealing means at the low pressure end of said valve supporting said valve when in transit and providing means for reversing the direction of movement of said valve when pressure is applied to said low pressure end of said carrier.

2. A traveling pipeline valve according to claim 1 wherein said flexible elastic means is made of a hard rubber.

3. A traveling pipeline valve according to claim 1 wherein said command signal actuator device is a solenoid valve.

4. A traveling pipeline valve according to claim 1 wherein said automatic actuator device is a check valve.

5. A traveling pipeline valve according to claim 1 wherein a single radio means is used for receiving the remote signals.

6. A traveling pipeline valve according to claim 1 wherein said carrier has mounted thereon housing means containing said flow control means and said means for transmitting a repeating signal.

7. A process for isolating sections of a pipeline transporting pipeline fluid to permit location of a leak in said pipeline comprising the steps of (1) inserting into said pipeline a traveling pipeline valve, (2) transporting said valve within the interior of said pipeline by means of a differential pressure created across said valve by a flexible sealing means on the high pressure end of said valve, said flexible sealing means being in contact with the inside diameter of said pipeline and said valve being further supported when in transit by a flexible sealing means at the low pressure end of said valve, (3) stopping said valve and the flow of said pipeline fluid by causing the expansion of a flexible elastic means on said valve and between said flexible sealing means, by said pipeline fluid, against the inside diameter of said pipeline, (4) determining the position of said valve within said pipeline, (5) determining the pressure of said pipeline fluid within the pipe section traversed by said valve, (6) contracting said flexible elastic means on said valve, and (7) reversing the direction of transport of said valve by applying pressure to a flexible sealing means on the low pressure end of said valve, said flexible sealing means being in contact with the inside diameter of said pipeline.

8. A process for isolating sections of a pipeline transporting pipeline fluid to permit location of a leak in said pipeline comprising the steps of (1) inserting into said pipeline a traveling pipeline valve, (2) transporting said valve within the interior of said pipeline by means of a differential pressure created across said valve by a flexible sealing means on the high pressure end of said valve, said flexible sealing means being in contact with the inside diameter of said pipeline and said valve being further supported when in transit by a flexible sealing means at the low pressure end of said valve, (3) systematically stopping said valve and the flow of said pipeline fluid by causing the expansion of a flexible elastic means on said valve and between said flexible sealing means, by said pipeline fluid, against the inside diameter of said pipeline, (4) systematically determining the position of said valve within said pipeline, (5) systematically determining the pressure of said pipeline fluid within the pipe section traversed by said valve, (6) systematically contracting said flexible elastic means on said valve and (7) systematically reversing the direction of transport of said valve by applying pressure to a flexible sealing means on the low pressure end of said valve, said flexible sealing means being in contact with the inside diameter of said pipeline.

9. A process for stopping the flow of pipeline fluid in a pipeline comprising the steps of (1) inserting into said pipeline a traveling pipeline valve, (2) transporting said valve within the interior of the pipeline by means of a differential pressure created across said valve by a flexible sealing means on the high pressure end of said valve, said flexible sealing means being in contact with the inside diameter of said pipeline and said valve being further supported when in transit by a flexible sealing means at the low pressure end of said valve, (3) reversing the direction of movement of said valve by applying pressure to the flexible sealing means at the low pressure end of said valve, and (b 4) stopping said valve and the flow of said pipeline fluid by causing the expansion of a flexible elastic means on said valve and between said flexible sealing means, by said pipeline fluid, against the inside diameter of said pipeline.

* * * * *